United States Patent [19]
Brenner et al.

[11] Patent Number: 6,041,594
[45] Date of Patent: Mar. 28, 2000

[54] MIXTURE DELIVERY DEVICE FOR INTERNAL COMBUSTION ENGINES

[75] Inventors: Frank Brenner, Ludwigsburg; Georg Weber, Brackenheim, both of Germany

[73] Assignee: Robert Bosch GmbH, Stuttgart, Germany

[21] Appl. No.: 09/100,322

[22] Filed: Jun. 19, 1998

[30]     Foreign Application Priority Data

Jun. 21, 1997  [DE]    Germany ........................... 197 26 392

[51] Int. Cl.$^7$ .................................................... F01N 3/02
[52] U.S. Cl. ................................ 60/309; 60/303; 60/295; 60/286; 239/427.5; 239/428
[58] Field of Search ............................ 60/309, 306, 295, 60/303, 286, 301; 239/419.3, 427.5, 428

[56]                    References Cited

U.S. PATENT DOCUMENTS

| | | | |
|---|---|---|---|
| 5,189,878 | 3/1993 | Robinson et al. | 60/309 |
| 5,272,871 | 12/1993 | Oshima et al. | 60/274 |
| 5,522,218 | 6/1996 | Lane et al. | 60/274 |
| 5,606,856 | 3/1997 | Linder et al. | 60/286 |
| 5,628,186 | 5/1997 | Schmelz | 60/274 |

FOREIGN PATENT DOCUMENTS 0 586 912 A2   3/1994   European Pat. Off. .

*Primary Examiner*—Thomas Denion
*Assistant Examiner*—Binh Tran
*Attorney, Agent, or Firm*—Ronald E. Greigg; Edwin E. Greigg

[57]                 ABSTRACT

A mixture delivery device for introducing a reducing agent into an exhaust gas system of an internal combustion engine in which, a urea-water solution is introduced into a region of the exhaust gas system, upstream of a catalytic converter, through the introduction of compressed air, in order to bring about the reduction of nitrogen oxides in the exhaust gas of the internal combustion engine. The mixture delivery device includes a mixture carrying line, with a first section that extends laterally to the exhaust gas flow and a second section that extends concentrically to a longitudinal axis of the exhaust gas system. The mixture carrying line is inserted into the exhaust gas system, wherein the urea-water solution is injected in the form of a cone into the exhaust gas upstream of the catalytic converter via blow-out openings embodied radially in the second section. The mixture delivery device is particularly suited for delivering a urea-water solution upstream of the catalytic converter in the exhaust gas system of a mixture compressing, spontaneously igniting internal combustion engine.

9 Claims, 2 Drawing Sheets

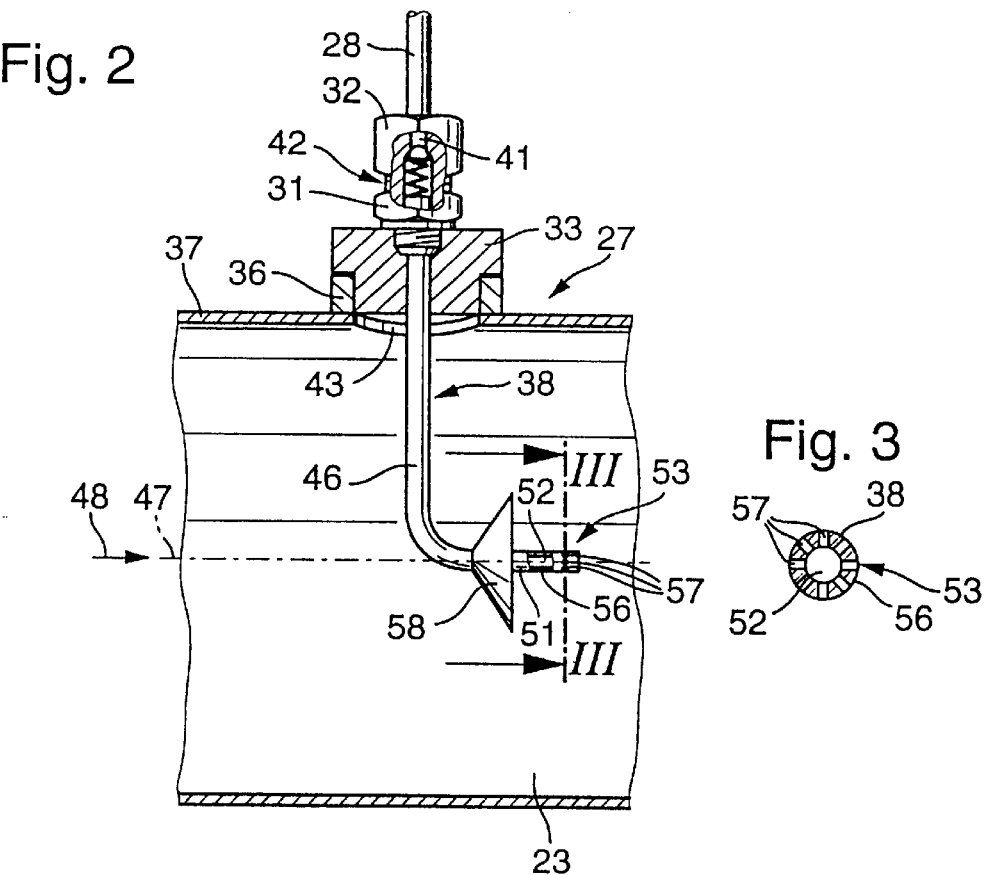
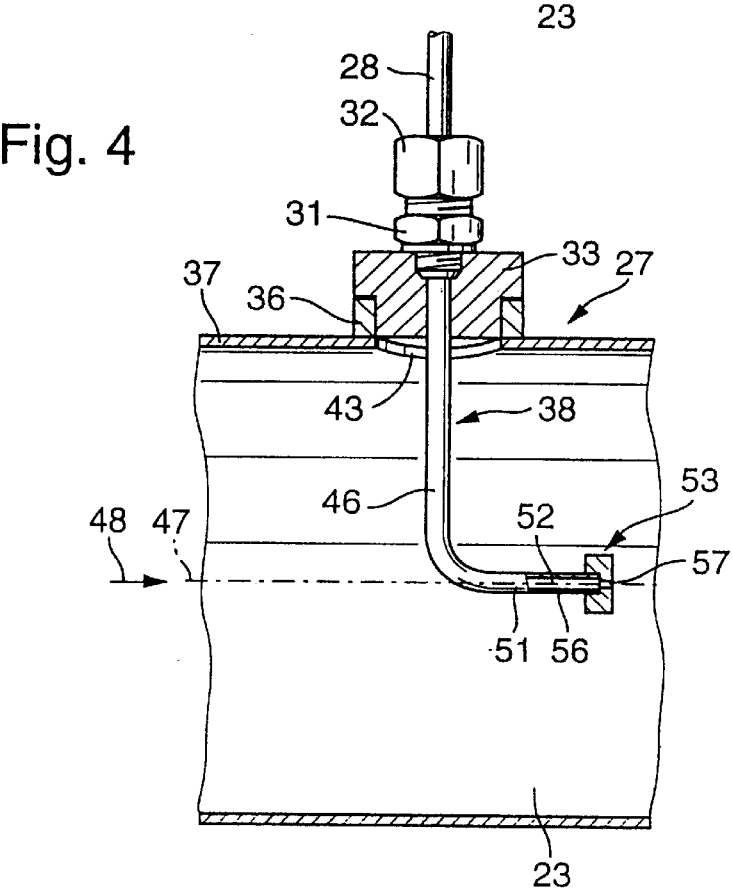

MIXTURE DELIVERY DEVICE FOR INTERNAL COMBUSTION ENGINES

PRIOR ART

The invention is based on a mixture delivery device for internal combustion engines. There is also the demand for a reduction in polluting exhaust gas components of internal combustion engines. For the purpose of reducing nitrogen oxides in the exhaust gasses of internal combustion engines, particularly mixture compressing spontaneously igniting engines, a urea-water solution is introduced into the exhaust system of the engine, upstream of a catalytic converter. In the catalytic converter, the introduced urea is converted by chemical reactions into ammonia, which achieves the reduction of nitrogen oxides. A similar mixture delivery device has already been disclosed (EP 0 586 912 A2), which is, however, only suited for a mixture injection into a region of the exhaust system in which the exhaust gas system runs at an angle.

ADVANTAGES OF THE INVENTION

The mixture delivery device has the advantage over the prior art that it can be used universally and can also be disposed in regions of exhaust gas systems in which the exhaust gas system does not run at an angle, and at the same time, an optimal position can be freely maintained in the axial spacing in relation to a catalytic converter.

Advantageous improvements and updates of the mixture delivery device are possible by means of the measures taken herein.

It is advantageous that the second section of the mixture carrying line that leads from the first section and extends in the downstream direction so that the radial mixture dispersion over the cross section of the exhaust gas system occurs uninfluenced by the first section.

It is likewise advantageous to connect the mixture carrying line upstream to a mixture metering valve that meters the mixture made up of air and the at least one reducing agent, which permits a better mixture metering.

It is particularly advantageous to provide the spray head with blow-out openings that radially penetrate the wall and are distributed over the circumference on the downstream end of the second section so that the mixture can be injected evenly over the cross section of the exhaust gas system, into the exhaust gas flowing past, in the form of a hollow cone that is inclined in the flow direction.

It is also particularly advantageous to provide the spray head with a throttling blow-out opening that extends concentrically to the longitudinal axis of the exhaust gas system and the cross section of this opening is smaller than the cross section of the mixture carrying conduit, which likewise produces a conical injection of the mixture over the cross section of the exhaust gas system, into the flowing gas.

A further advantage is produced by virtue of the fact that a check valve which opens in the direction of the mixture carrying line is disposed between the mixture carrying line and the mixture metering valve and this prevents exhaust gas from reaching the mixture metering valve when the mixture is not flowing.

An advantageous influence of the exhaust gas flow in the region of the spray head is possible due to the disposition of a conically embodied guide body concentric to the longitudinal axis on the second section, which body extends with its larger diameter upstream.

BRIEF DESCRIPTION OF THE DRAWINGS

Two exemplary embodiments of the invention are shown in simplified form in the drawings and will be explained in more detail in the description below.

FIG. 2 is a first exemplary embodiment of a mixture delivery device embodied according to the invention, for use in a urea dosing device according to FIG. 1, FIG. 3 shows a section along the line III—III in FIG. 2, and FIG. 4 shows a second exemplary embodiment of a mixture delivery device embodied according to the invention, for use in a urea metering device according to FIG. 1.

DESCRIPTION OF THE EXEMPLARY EMBODIMENTS

Figure 1:
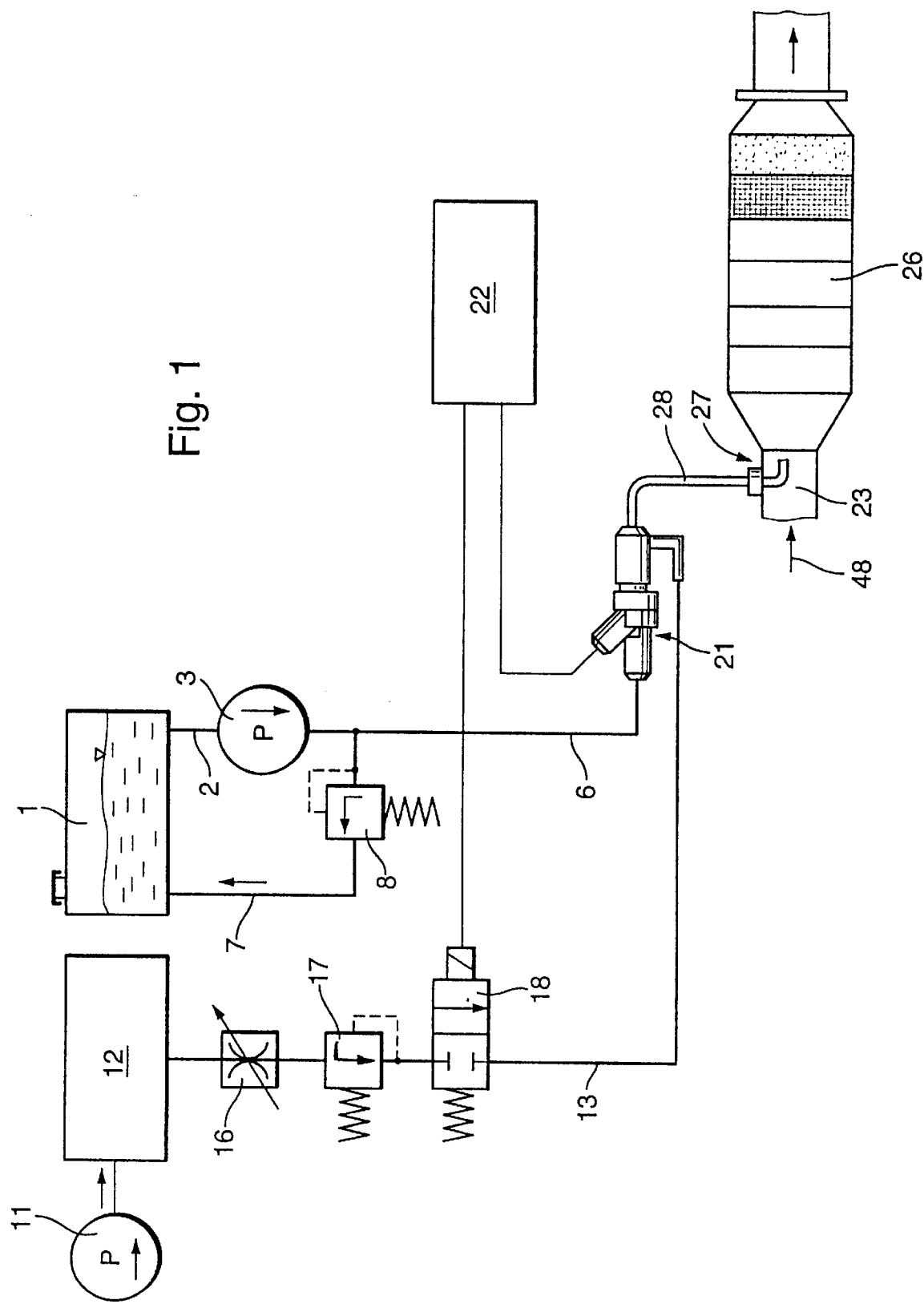
FIG. 1 is a schematically represented urea metering device for an exhaust gas system of an internal combustion engine, with a mixture delivery device embodied according to the invention.

In the urea metering device for the delivery of a urea-water solution upstream of a catalytic converter, into the exhaust gas system of an internal combustion engine, in particular of a mixture compressing, spontaneously igniting internal combustion engine, according to FIG. 1, a urea-water tank 1 is provided. A suction line 2 leads from the tank 1 to the intake side of a pressure generating urea delivery pump 3. The urea delivery pump 3 supplies a urea-water solution into a urea pressure line 6 connected to the pressure side. A discharge line 7 leads from the urea pressure line 6 back to the urea-water tank 1. A pressure limiting valve 8 is disposed in the discharge line 7 and limits the pressure in the urea pressure line 6, for example to 3 bar.

The urea metering device furthermore has an air pump 11 that supplies compressed air at 7 bar, for example, into an air reservoir 12. The air reservoir 12 is likewise connected to a compressed air line 13 in which an adjustable throttle valve 16, a pressure regulating valve 17, and an electromagnetically actuatable 2/2-way valve 18 are disposed in series. The pressure regulating valve 17 regulates the downstream pressure in the compressed air line 13, for example at 1 bar. The 2/2-way valve 18 has a closed position in which it is represented in FIG. 1, and an open position.

The urea pressure line 6 and the compressed air line 13 are connected to a mixture metering valve 21, which can be electromagnetically actuated and in which a mixture of the urea-water solution with the compressed air takes place. An electronic control unit 22 controls the 2/2-way valve 18 and the mixture metering valve 21. The mixture with the urea-water solution, which mixture is prepared uniformly and finely by means of the compressed air, is injected into an exhaust gas system 23 upstream of a catalytic converter 26 of a known type by means of a mixture delivery device 27. The urea introduced into the catalytic converter 26 is converted by chemical reactions into ammonia, which achieves the reduction of nitrogen oxides in the exhaust gas.

FIG. 2 shows a mixture delivery device 27 embodied according to the invention, according to a first exemplary embodiment. A connecting line 28 is provided between the mixture delivery device 27 and the mixture metering valve 21, for which a methanol-resistant injection valve that is known in gasoline injection can be used, for example an injection valve disclosed by DE 34 11 537 A1, and this connecting line 28 permits the mixture metering valve 21 to be disposed with sufficient distance from the exhaust gas system 23 in order to thermally de-couple the mixture metering valve 21 from the exhaust gas system 23. The mixture delivery device 27 has an inlet fitting 32, which is provided with an external thread to which a union nut 32 is screw connected, which is coupled to the connecting line 28.

Furthermore, the inlet fitting 31 has a second external thread which is screwed into a securing body 33. The securing body 33 is inserted into a securing frame 36 and is connected to it, for example by means of a screw connection. The securing frame 36 is connected to the outer surface of the wall 37 of the exhaust gas system 23, upstream of the catalytic converter 26. Aligned toward the inlet fitting 31, a mixture carrying line 38 is inserted in the holding body 33 and is connected by a through conduit 41 in the inlet fitting 31 to the connecting line 28 in the flow connection. A check valve 42 that opens toward the mixture carrying line 38 can be disposed in the inlet fitting 31 and prevents exhaust gas from flowing into the connecting line 28 and therefore into the mixture metering valve 21 when the mixture metering valve 21 is not actuated. In the region of the securing frame 36, the wall 37 of the exhaust gas system 23 has a through opening 43 through which the mixture carrying line 38 protrudes into the exhaust gas system with a first section 46 lateral to a longitudinal axis 47. An arrow 48 indicates the exhaust gas flow direction along the longitudinal axis 47. The first section 46 of the mixture carrying line 38 is connected to a second section 51, which extends concentrically to the longitudinal axis 47 and extends in the direction of the exhaust gas flow 48. The mixture carrying line 38 has a mixture carrying conduit 52 and ends in the exhaust gas system 23 at the second section 51 with a spray head 53. In the exemplary embodiment according to FIG. 2 and the section III—III in FIG. 2, depicted in an altered scale in FIG. 3, the spray head 53 has blow-out openings 57 that radially penetrate the line wall 56 of the second section 51, which are disposed in a plane and are evenly or unevenly distributed over the circumference, and the mixture from the mixture carrying conduit 52 can be injected via these openings into the exhaust gas of the exhaust gas system 23. The mixture carrying conduit 52 is normally closed downstream of the blow-out openings 57 in the exemplary embodiment according to FIG. 2. The mixture emerging radially from the blow-out openings 57 is carried along over the entire cross section of the exhaust gas line 23 by the exhaust gas flow 48, which runs in the direction of the catalytic converter 26 and is in the form of a hollow cone that extends almost to the wall 37, wherein a higher concentration of the mixture occurs in the region of the longitudinal axis 47 than in the vicinity of the wall 37. A concentration distribution of this kind is desirable since the catalytic converter is also more active in the center due to the higher temperatures. To influence the mixture concentration over the cross section of the exhaust gas system 23, it can be advantageous to dispose a conical guide body 58 upstream of the spray head 53, which body extends with its greatest diameter downstream.

The second exemplary embodiment according to FIG. 4 has the same reference numerals for the same parts or parts that have the same function in relation to the first exemplary embodiment according to FIGS. 2 and 3, and differs from the above exemplary embodiment merely by virtue of the fact that the radially disposed blow-out openings are not present on the second section 51 and instead, the spray head 53 is slid in the form of a diaphragm body onto the downstream end of the second section 51 of the mixture carrying line 38 and has one blow-out opening 57 which has a smaller cross section than the cross section of the mixture carrying conduit 52 and extends concentrically to the longitudinal axis 47. Through this blow-out opening 57, the mixture is likewise injected conically into the exhaust gas flow 48 with a concentration that leads to a higher mixture concentration in the center of the catalytic converter, while the concentration is lower in the vicinity of the wall 37. As in the exemplary embodiment according to FIGS. 2 and 3, in the exemplary embodiment according to FIG. 4, the axial spacing of the blow-out opening 57 or the blow-out openings 57 in relation to the catalytic converter 26 can also be freely selected in order to achieve an optimal position for maintaining an optimal mixture distribution at the inlet of the catalytic converter. In addition, even in the exemplary embodiment according to FIG. 4, it is possible to dispose a check valve 42 or a guide body 58, as shown in the exemplary embodiment according to FIG. 2.

The foregoing relates to a preferred exemplary embodiment of the invention, it being understood that other variants and embodiments thereof are possible within the spirit and scope of the invention, the latter being defined by the appended claims.

We claim:

1. A mixture delivery device for conveying at least one reducing agent into an exhaust gas system for an internal combustion engine, comprising a mixture carrying line that carries a mixture made up of air and at least one reducing agent through a wall of the exhaust gas system and ends at a spray head inside of the exhaust gas system, said mixture carrying line (38) is connected upstream to a mixture metering valve (21) that meters the mixture made up of air and the at least one reducing agent, a mixture carrying conduit is embodied in said mixture carrying line, the mixture carrying line (38) has a first section (46), which extends lateral to a longitudinal axis (47) of the exhaust gas system (23), which longitudinal axis extends in the exhaust gas flow direction (48), and has a second section (51) that is connected to the first section (46) and extends concentrically to the longitudinal axis (47) of the exhaust gas system (23), and a spray head (53) is provided on a downstream end of the second section (51) and is connected directly with said mixture carrying line (38), said spray head (53) has a throttling blow-out opening (57) that extends concentrically to the longitudinal axis (47) of the exhaust gas system (23) and a cross section of this opening is smaller than a cross section of the mixture carrying conduit (52).

2. A mixture delivery device according to claim 1, in which the second section (51) of the mixture carrying line (38) leads from the first section (46) and extends in the exhaust gas flow direction (48).

3. A mixture delivery device according to claim 2, in which a check valve (42) that opens toward the mixture carrying line (38) is disposed between the mixture carrying line (38) and the mixture metering valve (21).

4. A mixture delivery device according to claim 2, in which said second section of pipe (38) is provided with a conical guide body (58) upstream of said spray head (53).

5. A mixture delivery device according to claim 1, in which a check valve (42) that opens toward the mixture carrying line (38) is disposed between the mixture carrying line (38) and the mixture metering valve (21).

6. A mixture delivery device according to claim 1, in which said second section of pipe (38) is provided with a conical guide body (58) upstream of said spray head (53).

7. A mixture delivery device for conveying at least one reducing agent into an exhaust gas system of an internal combustion engine, comprising a mixture carrying line that carries a mixture made up of air and at least one reducing agent through a wall of the exhaust gas system and ends at a spray head inside of the exhaust gas system, said mixture carrying line (38) is connected upstream to a mixture metering valve (21) that meters the mixture made up of air and the at least one reducing agent, a check valve (42) that opens toward the mixture carrying line (38) is disposed between the mixture carrying line (38) and the mixture metering valve (21), a mixture carrying conduit is embodied in said mixture carrying line, the mixture carrying line (38) has a first section (46), which extends lateral to a longitudinal axis extends in the exhaust gas flow direction (48), and has a second section (51) that is connected to the first section (46) and extends concentrically to the longitudinal axis (47) of the exhaust gas system (23), and a spray head (53) provided on a downstream end of the second section (51) has blow-out openings (57) that radially penetrate the line wall (56) and are distributed over the circumference of the mixture carrying line (38), and the mixture flows via these openings from the mixture carrying conduit (52) into the exhaust gas.

8. A mixture delivery device according to claim 7, in which the second section (51) of the mixture carrying line (38) leads from the first section (46) and extends in the exhaust gas flow direction (48).

9. A mixture delivery device for conveying at least one reducing agent into an exhaust gas system of an internal combustion engine, comprising a mixture carrying line that carries a mixture made up of air and at least one reducing agent through a wall of the exhaust gas system, a mixture carrying conduit is embodied in said mixture carrying line, the mixture carrying line (38) has a first section (46), which extends lateral to a longitudinal axis (47) of the exhaust gas system (23), which longitudinal axis extends in the exhaust gas flow direction (48), and has a second section (51) that is connected to the first section (46) and extends concentrically to the longitudinal axis (47) of the exhaust gas system (23), the second section (51) of the mixture carrying line (38) leads from the first section (46) and extends in the exhaust gas flow direction (48), and a conical guide body (58) is disposed on the second section (51) upstream of the spray head (53), concentric to the longitudinal axis (47), with its largest diameter pointing downstream.

* * * * *